(12) United States Patent
Rivas et al.

(10) Patent No.: US 9,534,658 B1
(45) Date of Patent: Jan. 3, 2017

(54) ENERGY STORAGE DEVICE

(71) Applicants: Nelson Rivas, East Meadow, NY (US); Gary Provenzano, Boca Raton, FL (US)

(72) Inventors: Nelson Rivas, East Meadow, NY (US); Gary Provenzano, Boca Raton, FL (US)

(73) Assignee: KINETX, LLC, Boca Raton, FL (US)

( * ) Notice: Subject to any disclaimer, the term of this patent is extended or adjusted under 35 U.S.C. 154(b) by 55 days.

(21) Appl. No.: 14/024,449

(22) Filed: Sep. 11, 2013

Related U.S. Application Data

(60) Provisional application No. 61/699,785, filed on Sep. 11, 2012.

(51) Int. Cl.
*H02K 7/02* (2006.01)
*F16F 15/30* (2006.01)

(52) U.S. Cl.
CPC .................... *F16F 15/302* (2013.01)

(58) Field of Classification Search
CPC .................. F16F 15/30; H02K 7/025
See application file for complete search history.

(56) References Cited

U.S. PATENT DOCUMENTS

| 5,065,060 A | 11/1991 | Takahashi et al. | |
| 5,831,362 A * | 11/1998 | Chu et al. | 310/90.5 |
| 6,043,577 A * | 3/2000 | Bornemann et al. | 310/74 |
| 6,304,011 B1 * | 10/2001 | Pullen et al. | 310/52 |
| 7,679,245 B2 * | 3/2010 | Brackett et al. | 310/90.5 |
| 2005/0040776 A1 * | 2/2005 | Sibley | 318/150 |
| 2011/0298293 A1 * | 12/2011 | Veltri | 307/84 |
| 2014/0125171 A1 * | 5/2014 | Bremer et al. | 310/74 |

OTHER PUBLICATIONS

Werfel, F. N. et al. "HTS Magnetic Bearings in Prototype Application", IEEE Transactions on Applied Superconductivity, Jun. 2010, vol. 20, No. 3, pp. 874-879, Adelwitz Technologiezentrum GmbH (ATZ), Adelwitz, Germany.

* cited by examiner

*Primary Examiner* — Vicky Johnson
(74) *Attorney, Agent, or Firm* — Collard & Roe, P.C.

(57) ABSTRACT

At least one embodiment of the invention relates to an energy storage device comprising a housing, at least one flywheel disposed in the housing, and at least one stabilizing element disposed in the housing configured to stabilize the flywheel. There can be at least one cooling element for cooling a region interior of the housing to a preset temperature. In at least one embodiment, the stabilizing element comprises a magnet. In at least one embodiment the stabilizing element can be orientated at a position offset from a horizontal axis. In at least one embodiment the stabilizing element is orientated at a position offset from a vertical axis In at least one embodiment the stabilizing element is orientated at a position between a horizontal axis and a vertical axis. In at least one embodiment, the stabilizing element comprises at least one magnet coupled to the flywheel orientated at a first angle and at least one magnet coupled to the housing orientated at an angle substantially parallel to said first angle of orientation of the magnet coupled to the flywheel.

12 Claims, 20 Drawing Sheets

SECTION A-A

SECTION A-A

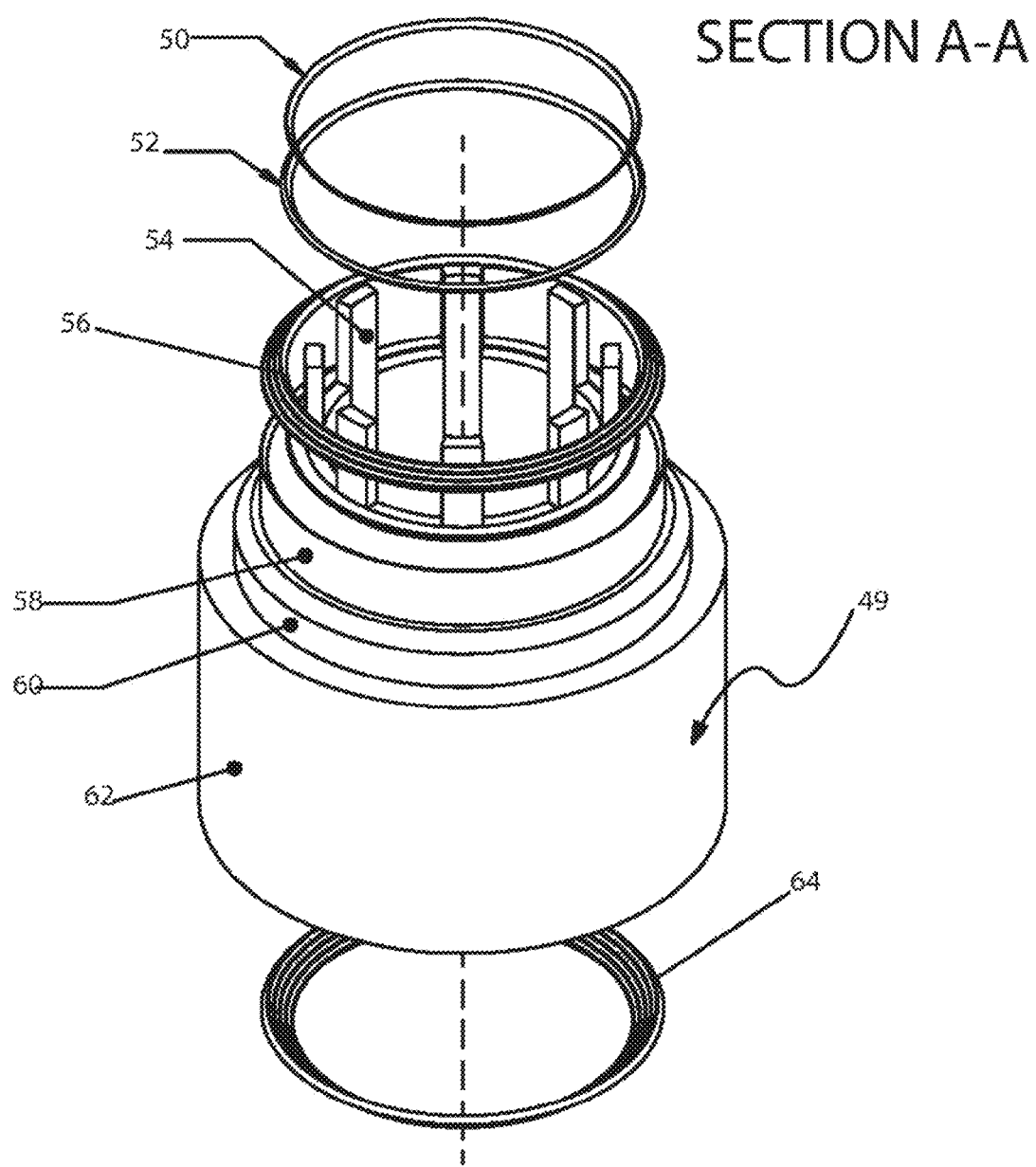

SECTION A-A

DETAIL B

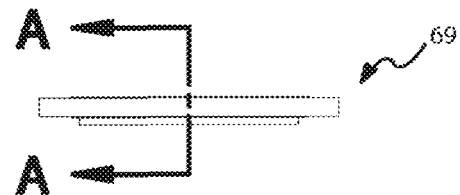
FIG. 12A
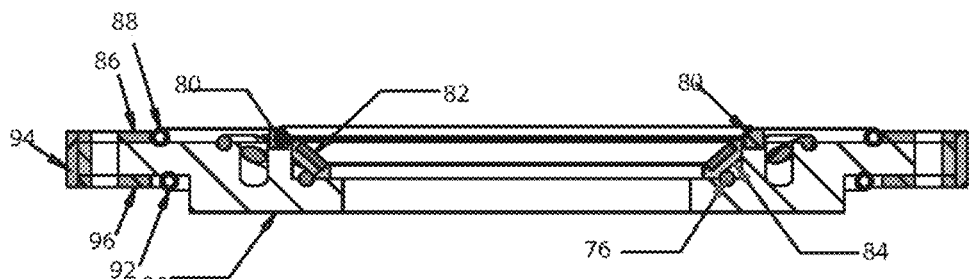
FIG. 12B  SECTION A-A
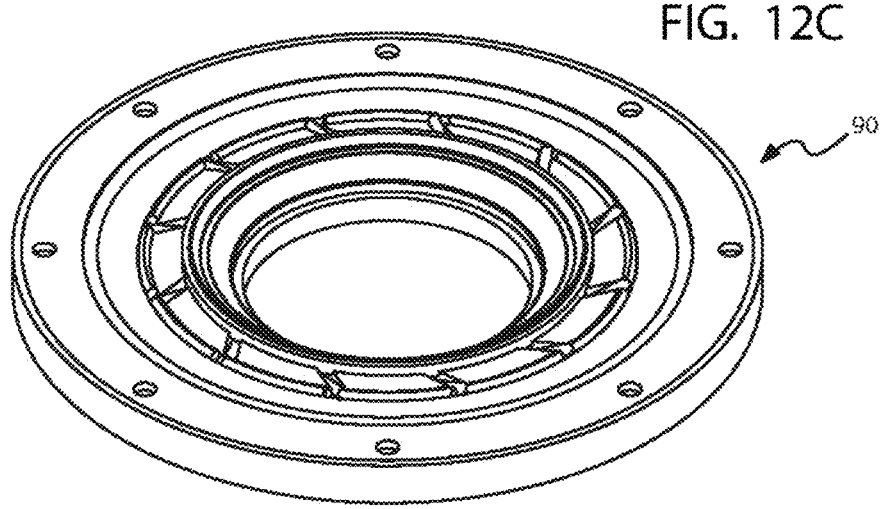
FIG. 12C

SECTION A-A

SECTION A-A

SECTION A-A

ENERGY STORAGE DEVICE

CROSS REFERENCE TO RELATED APPLICATIONS

This application is a non-provisional application that claims priority from provisional application Ser. No. 61/699,785 filed on Sep. 11, 2012 the disclosure of which is hereby incorporated herein by reference in its entirety.

BACKGROUND OF THE INVENTION

At least one embodiment of the invention relates to an energy storage device comprising a plurality of magnets configured to stabilize an energy storage element such as a flywheel. The flywheel is suspended in a gaseous medium or vacuum via a non-physical contact or support such as via superconducting magnets.

High temperature superconducting magnetic bearings are used for the rapid rotation of flywheels. High temperature superconductors such as those with YBCO or Yttrium Barium Copper Oxide bearings have to be cooled but are stable without electronics control. Superconducting magnetic bearings can be self-regulated (by an electromagnetic field) without monitoring and electromagnetic regulation/attraction of the rotor. Control and specification of the properties of HTS magnets such as levitation pressure (load), restoring forces (stiffness) and damping are determined by the magnetic interaction design. See *HTS Magnetic Bearings in Prototype Application* F. N. Werfel, U. Floegel-Delor, T. Riedel, R. Rothfeld, D. Wippich, and B. Goebel are with the Adelwitz Technologiezentrum GmbH (ATZ), Adelwitz, Germany. Manuscript received 20 Oct. 2009. The general teachings of flywheels is disclosed in U.S. Pat. No. 5,065,060 to Takahashi et al, the disclosure of which is hereby incorporated herein by reference in its entirety.

SUMMARY OF THE INVENTION

At least one embodiment of the invention relates to an energy storage device comprising a housing, at least one flywheel disposed in the housing, and at least one stabilizing element disposed in the housing configured to stabilize the flywheel. There can be at least one cooling element for cooling a region interior of the housing to a preset temperature.

In at least one embodiment, the stabilizing element comprises a magnet. In at least one embodiment, the stabilizing element can be orientated at a position offset from a horizontal axis. In at least one embodiment, the stabilizing element is orientated at a position offset from a vertical axis In at least one embodiment, the stabilizing element is orientated at a position between a horizontal axis and a vertical axis. In at least one embodiment, the stabilizing element comprises at least one magnet coupled to the flywheel orientated at a first angle and at least one magnet coupled to the housing orientated at an angle substantially parallel to said first angle of orientation of the magnet coupled to the flywheel.

In at least one embodiment the cooling element comprises a cryogenic cooling system coupled to the housing, wherein the cryogenic cooling system further comprises heat pipes coupled to a cryogenic generator for removing heat from the housing. In at least one embodiment, the cryogenic cooling system is a self-contained sealed system. In at least one embodiment, the device comprises a motor disposed inside of the housing. In at least one embodiment, the motor is a synjet.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 2A is a side view of the housing with the cross-sectional line A-A extending there-through;

FIG. 8 is an exploded side-top perspective view of the flywheel system;

FIG. 12A is a side view of an end cap of the housing having bisecting line A-A taken through it;

FIG. 12B is a side cross-sectional view of the end cap taken along line A-A;

FIG. 12C is a perspective view of the end cap;

FIG. 13A is a side view of the stator of the flywheel with the bisecting line A-A extending there-through;

DETAILED DESCRIPTION OF PREFERRED EMBODIMENTS

Figure 1:
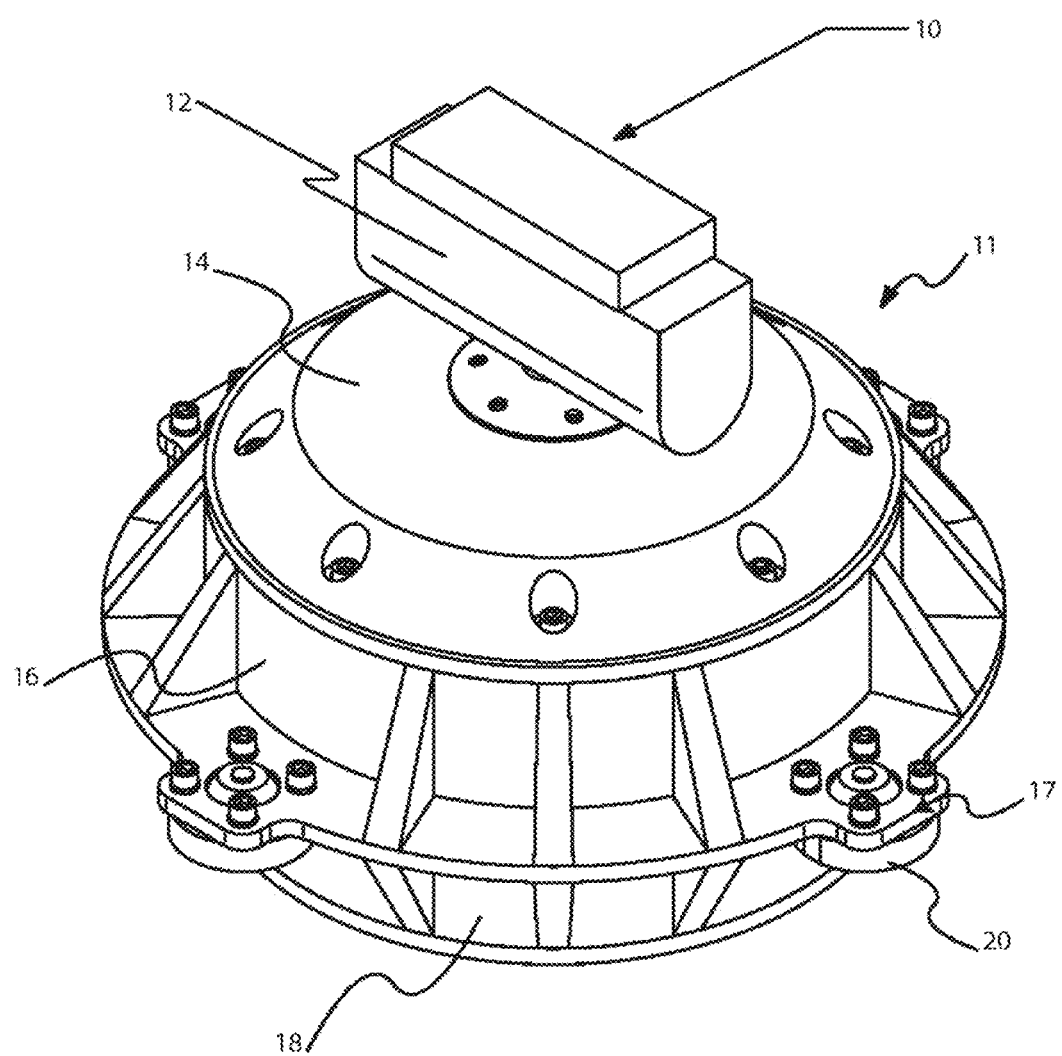
FIG. 1 is a perspective view of the device.

Turning in detail to the drawings, FIG. 1 is a perspective view of a housing for a flywheel or energy storage device 10. This device 10 is an energy storage device which includes a housing 11 coupled to a cryocooler 12. Housing 11 comprises a first cover 14, a second cover 120, see FIG. 17, a first section 16 and a second section 18 of a housing body 17. These covers forming an outer housing 11 can be made from any suitable material such as steel, or more particularly stainless steel. First section 16, and second section 18 can be formed as a single body 17 for the housing.

Figure 2A:
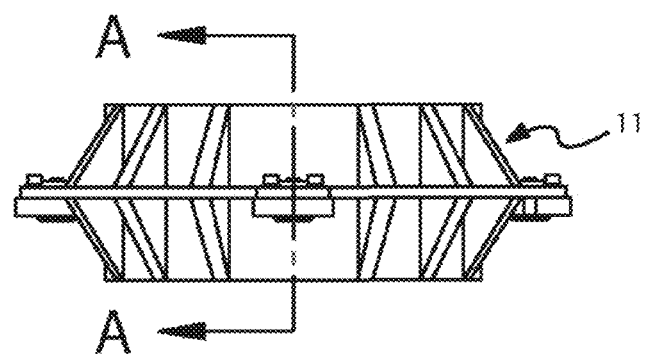
Figure 2B:
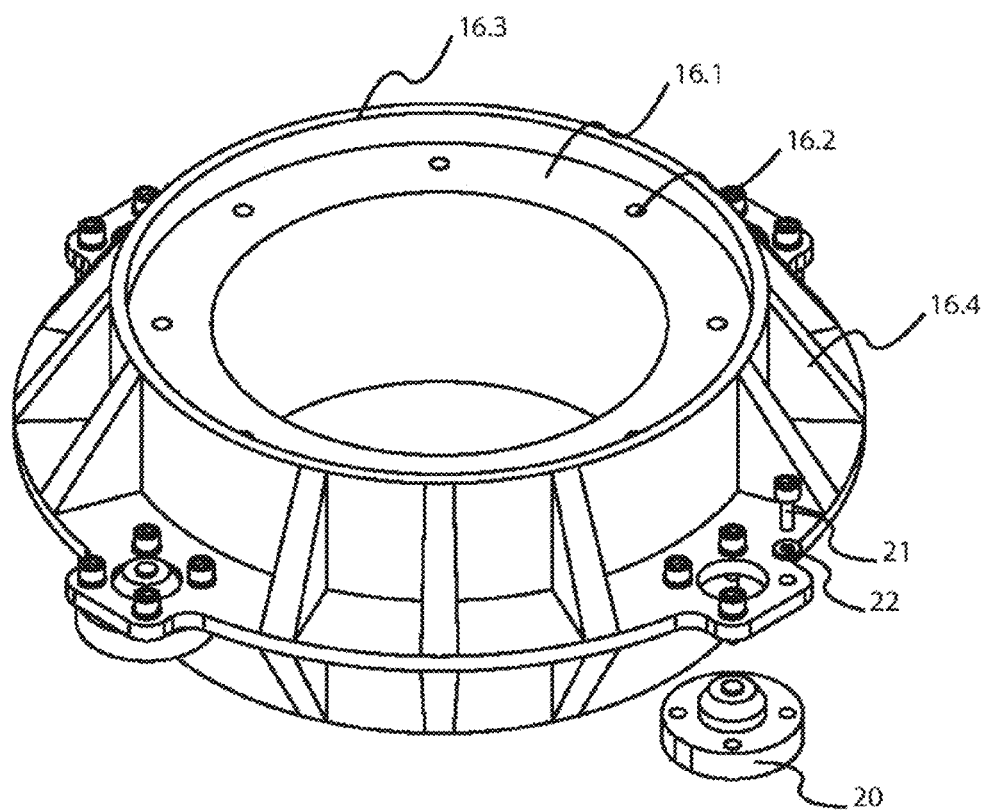
FIG. 2B is a perspective view of the housing.

FIG. 2A shows a side view of the body 17, which is a center portion of the housing 11, with a section line A-A extending there-through. FIG. 2B shows a top perspective view of the housing 11 with the cover 14 removed. This view shows a recessed region 16.1 as well as drill holes 16.2 which are configured to receive fasteners such as screws which seal the cover 14 to the housing. The screws can be formed from any material such as stainless steel as well. Side support fins 16.4 are configured to support side walls 16.3 of the housing. A plurality of screws 21 with washers 22 are configured to couple to dampers or boots 20. Boots or dampers 20 are configured to dampen any vibrations within the system. These boots can be made from any suitable damping materials such as rubber, composite metal or any other suitable material including at least steel such as stainless steel.

Figure 3:
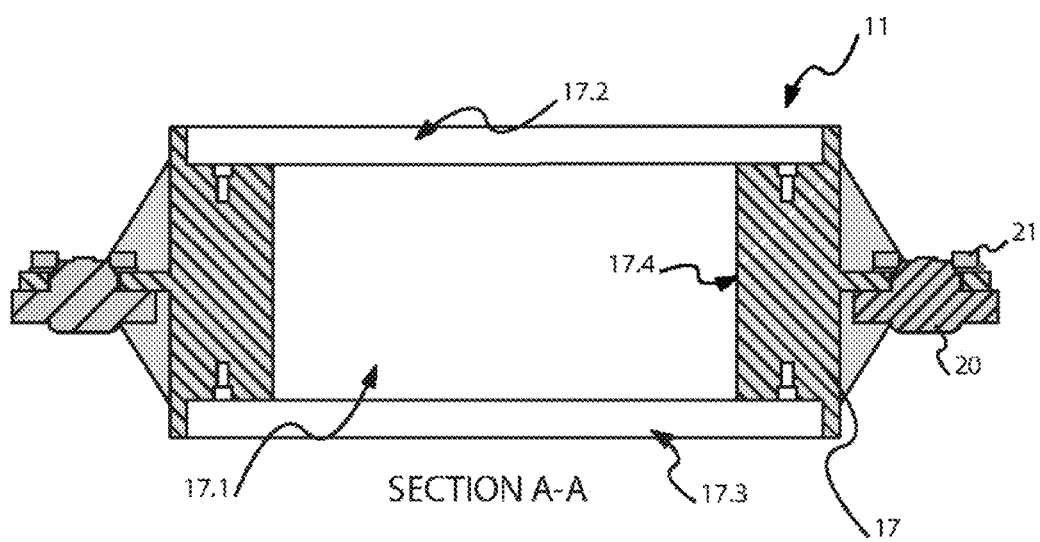
FIG. 3 is a side cross-sectional view of the device taken across the line A-A.

FIG. 3 is a side cross-sectional view of the housing 11 including housing body 17. This view shows gaps or recesses or openings 17.1 and 17.2 in the housing 11. A body or inner wall 17.4 extends along the extension of the housing as well. This wall 17.4 is configured as a substantially solid wall. This housing is made from any suitable material such as metal, ceramic, composite, carbon graphite or any other suitable material such as steel or stainless steel.

Figure 4A:
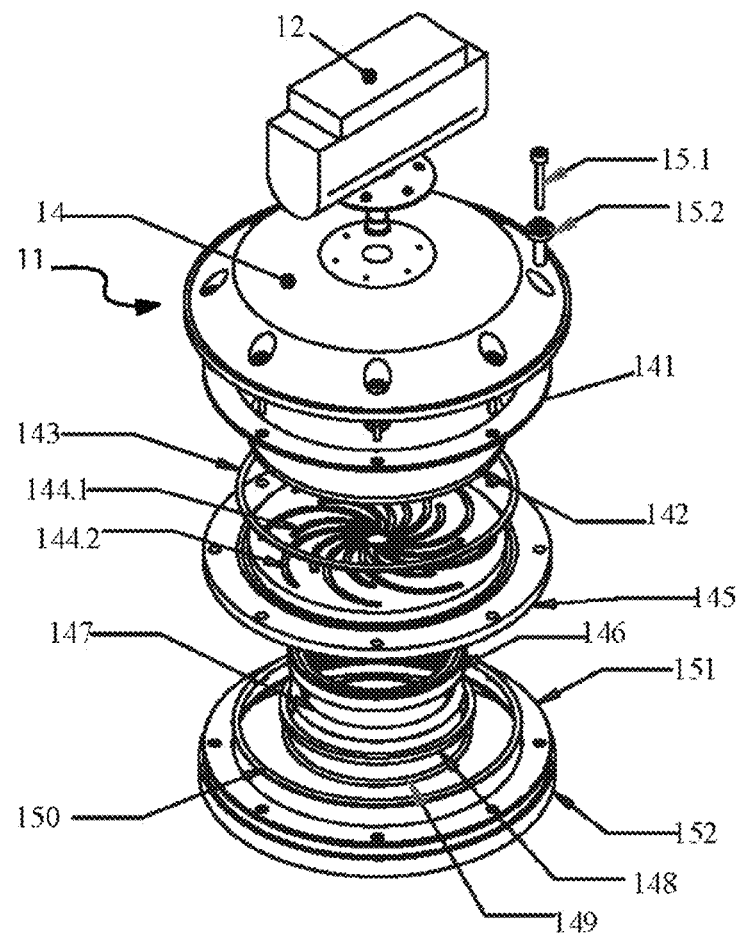
FIG. 4A is an exploded top view of the device.

FIG. 4A is a side exploded perspective view of the cover for the housing 14 with the cryocooler 12 disposed on top. Cover 14 has a plurality of screws 15.1 and 15.2 which are configured to fix the cover to the body of the housing 11. In addition there is an insulation plate 141 coupled to cover 14 via these screws 15.1 and 15.2. The insulators such as insulation plate 141 can be made from any suitable material such as a phenolic or other cryogenic insulating material. There is also a compression O-ring 143 which is configured to be compressed when cover 14 is coupled to heat sink transfer top 145. The O-rings can be made from a cryogenically impervious rubber or flexible material or synthetic and can have a stainless steel internal structure, either in a webbing or belt structure. In addition, there are a plurality of inner heat pipes 144, and outer heat pipes 153 disposed in heat sink transfer top or block 145. The heat pipes can be made from a stainless steel walled device having a porous metal wick and filled with a fluid such as liquid nitrogen. These inner heat pipes 144 can comprise multiple heat pipes 144.1, 144.2, and 144.3 while outer heat pipes can comprise multiple heat pipes as well such as at least four heat pipes, at least six heat pipes or even at least eight heat pipes for each of the inner heat pipes These heat pipes can be made from any suitable heat pipe manufacturer such as Thermacore® heat pipes. Disposed adjacent to heat sink transfer top 145 is a block support 146 for a magnet 147. These heat sink transfer plates can be made from any suitable thermally conducting materials such as copper or steel such as stainless steel. Magnet 147 is configured as a ring magnet which is configured to reside inside of the housing and support the flywheel as it is rotating. The ring magnet 147 can be configured as a permanent magnet, an electromagnet, a ferro-magnet or a rare earth magnet. Disposed adjacent to magnet 147 is a bearing landing 148. The bearing landing 148 is configured to support the flywheel in the event the flywheel is temporarily not supported by the magnet 147. Bearing landing 148 can be made from any suitable material such as stainless steel. There is also a pad landing 149 which is coupled to ring sleeve 152 as well. Pad landing 149 is made from a cryo-teflon glass impregnated material. Ring sleeve 152 has a surface 151 for coupling to top 14. In addition, there is a gasket or compression O-ring 150 which is configured to provide a tight seal for the housing.

Figure 4B:
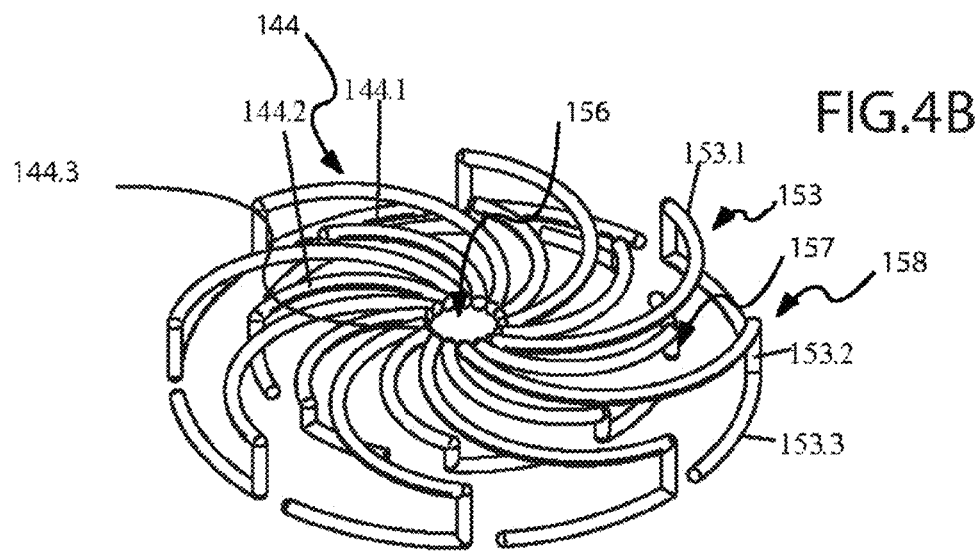
FIG. 4B is a perspective view of the cooling pipes in the device.

FIG. 4B is a top perspective view of the heat piping which is the inner heat pipes 144 and the outer heat pipe 153. These heat pipes extend in a spiral direction radiating outward from a central or substantially center region of the housing to an outer region of the housing. Outer heat pipe 153 includes a first curved or circular section 153.1, a second section 153.2 which extends transverse or in at least one embodiment substantially perpendicular to the extension of the circular section 153.1. A third curved section 153.2 is a circular section which circles back on an outer rim in a substantially opposite direction to the direction of first circular section 153.1. The inner heat pipe 144 is also configured in a similar manner, with a spiral shape, a substantially transverse extending section and then a third section extending in an opposite direction or substantially opposite direction. The outer heat pipes radiate to a region outside of the inner set of heat pipes. Thus the inner set of heat pipes 144.1, 144.2, and 144.3 as well as the outer or second set of heat pipes 153, all start in the same inner or center or central region 156, but the inner set of heat pipes all end in a first radially outer region 157 while the second set of heat pipes 153 end in a second region 158 which is radially outside the first outer region 157, relative to the central region 156.

Figure 5A:
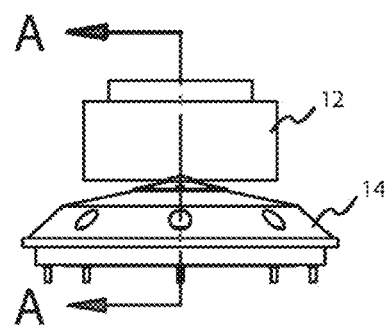
FIG. 5A is a side view of the device.
Figure 5B:
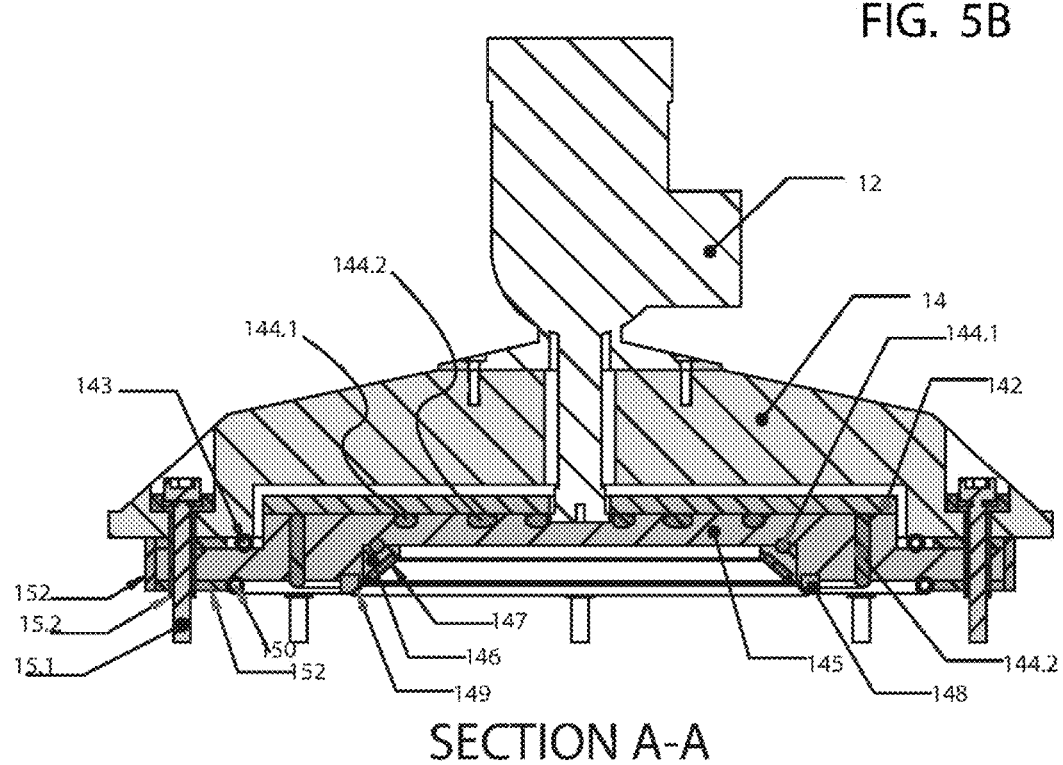
FIG. 5B is a side cross-sectional view of the device taken along the line A-A.

FIG. 5A is a side view of cover 14 with cryocooler 12 coupled to cover 14. Cryocooler 12 extends through an opening in cover 14 and is coupled to heat sink transfer top or block 145 See FIG. 5B. Heat sink transfer 145 includes a plurality of recesses for receiving heat pipes 144.1 and 144.2. Cover 14 extends down and is secured by screw 15.1 and sleeve 15.2. Cover 14 is secured to heat sink transfer top or block 145 via a compression O-ring 143 which extends substantially circularly around the top. In addition, another O-ring 150 is configured to create a sealing coupling to the body section 17 as well. A ring sleeve 152 is coupled around transfer top or block 145, and is secured thereto via screws 15.1. Ring sleeve 152 forms an insulating sleeve to insulate the body of the heat sink transfer from outside elements. This ring sleeve 152 can be made from any suitable material such as a phenolic or any other cryogenic insulating material.

Coupled to transfer top or block 145 is a block or support 146 for magnet 147. Block or support 146 can be made from any suitable material. In at least one embodiment, the block or support can be made from a highly thermally conductive material such as copper. The transfer top or block 145 can also be made from a highly thermally conductive material such as copper as well. Magnets 147 can be made from any suitable material such as rare earth metals or ferromagnetic material suitable to provide for a relatively strong magnetic force. This assembly with cryocooler 12 is configured to draw heat from this top portion of the device and from the interior of the housing and to dispel this heat through the cryocooler. Heat pipes 144.1 and 144.2 which extend throughout the transfer top or block 145. A pad or bearing landing 148, 149 is coupled to the transfer block 145 and is disposed to receive the spinning flywheel if it becomes orientated off of its axis.

Figure 6A:
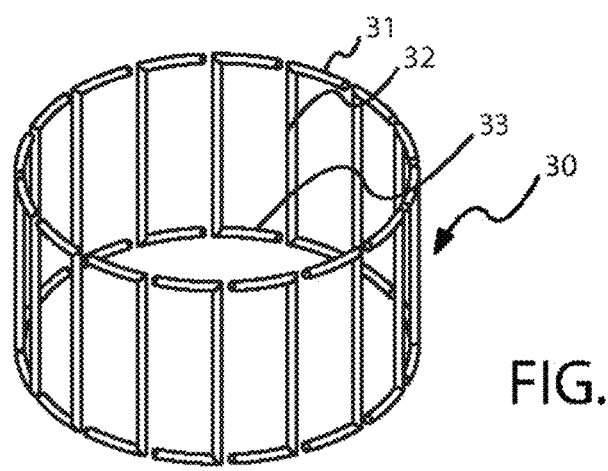
FIG. 6A is a perspective view of heat pipes used in cooling the flywheel.
Figure 6B:
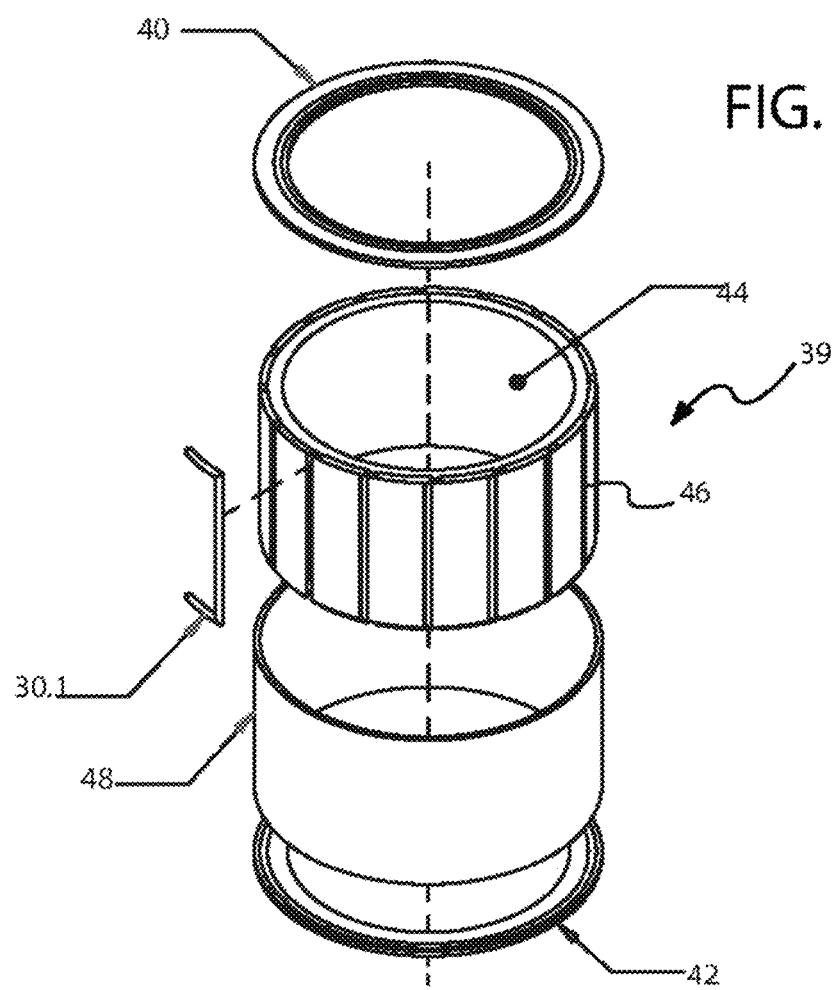
FIG. 6B is an exploded perspective view of a flywheel without the heat pipes installed.

FIGS. 6A and 6B show an outer casing 39 which is configured to be disposed adjacent to the top section, and is configured to be disposed around the flywheel assembly 49 (See FIG. 8). This outer casing 39 includes a transfer plate 40 at one end and, an opposite transfer plate 42 at the opposite end. Transfer plate 40 can be made from any suitable material such as copper. There is a safety ring 44 made of carbon fiber and which is configured to have a series of slots 46 disposed to receive heat pipes 30. Heat pipes 30 include a first section 31, a second section 32 and a third section 33, wherein these three sections form a substantially C-shaped heat pipe. A plurality of individual heat pipes 30.1 are disposed around the container and are configured to cool this container down. As indicated above, these heat pipes can be made from any suitable material such as stainless steel or copper.

Figure 7A:
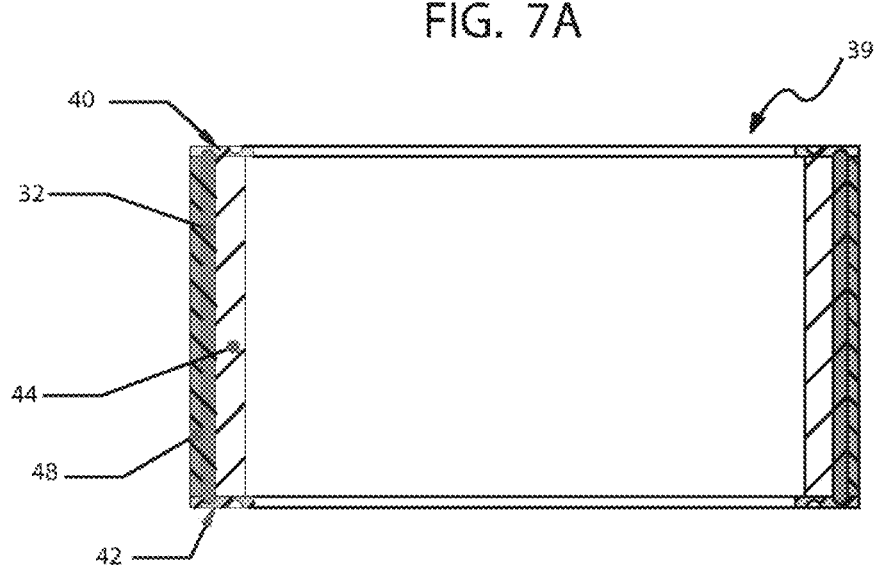
FIG. 7A is a side cross-sectional view of the flywheel housing taken along the line A-A in FIG. 7C.
Figure 7B:
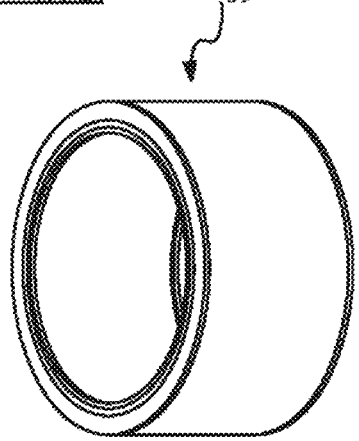
FIG. 7B is a perspective view of the flywheel housing.
Figure 7C:
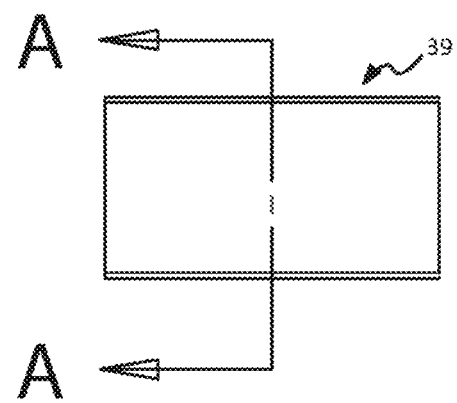
FIG. 7C is a side view of the flywheel housing with the line A-A taken through it.

FIG. 7A is a side view of this outer casing 39, while FIG. 7B is a perspective view of this end casing 39 while FIG. 7C is a side cross-sectional view of this casing 39 with the different layers shown in cross-sectional view. For example, this view shows casing 39 which has inner layer 44, second section of heat pipe 32 as well as insulation sleeve 48 as well. Transfer plates 40 and 42 are shown top and bottom of this sleeve. These transfer plates 40 and 42 are configured to conduct heat to a sufficiently high extent to draw heat out from the chamber formed inside of this casing 39. These transfer plates can be made from copper while the insulation sleeve is made from phenolic or any other cryogenic insulating material.

FIG. 8 is a top side perspective view of the flywheel assembly 49. Flywheel assembly 49 includes a ring separation pole 50 which is configured to separate to inner magnets 54 from magnets 52 and the magnet assembly 56. Magnets 54 are made from any suitable magnetic material such as ferromagnetic material, permanent magnets, rare earth magnets etc. Surrounding the magnets 54 and supporting magnets 52 and 56 is a core of laminate iron 58. This core of laminate iron is a plurality of different layers of iron in a laminate formation. Surrounding this core is a rim of steel 60. Surrounding rim 60 is a carbon fiber flywheel casing 62. These different layers are configured to hold the flywheels integrity and shape once it is spinning at high speeds. Coupled to the bottom of the flywheel is another assembly of magnets 64 configured in a beveled shape. This assembly of magnets 64 is configured to support the flywheel as it is spinning about its central axis. The flywheel is driven by a stator providing a magnetic field on magnets 54. These magnetic forces cause the rotation of this flywheel assembly 49 within the housing. This flywheel can rotate in a frictionless or substantially frictionless environment because high temperature superconducting magnets 147 and 82 (See FIG. 17) allow this flywheel to be suspended in air in a suspension vacuum while rotating within the housing by acting on magnets 56 and 64. Because high temperature superconducting magnets (HTS) are used, there are few losses to the system as the flywheel is rotating.

Figure 9A:
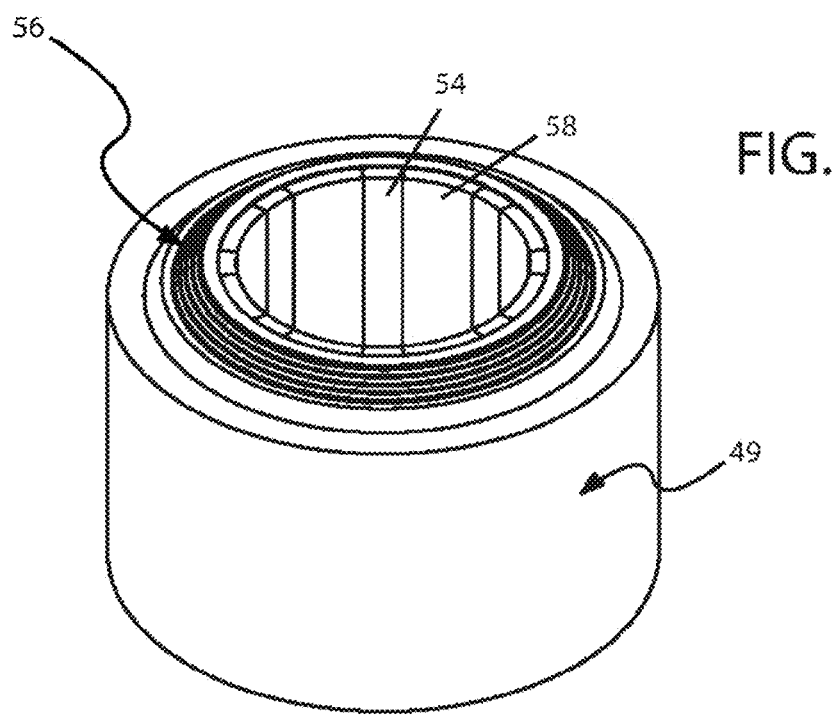
FIG. 9A is a top perspective view of the flywheel system.
Figure 9B:
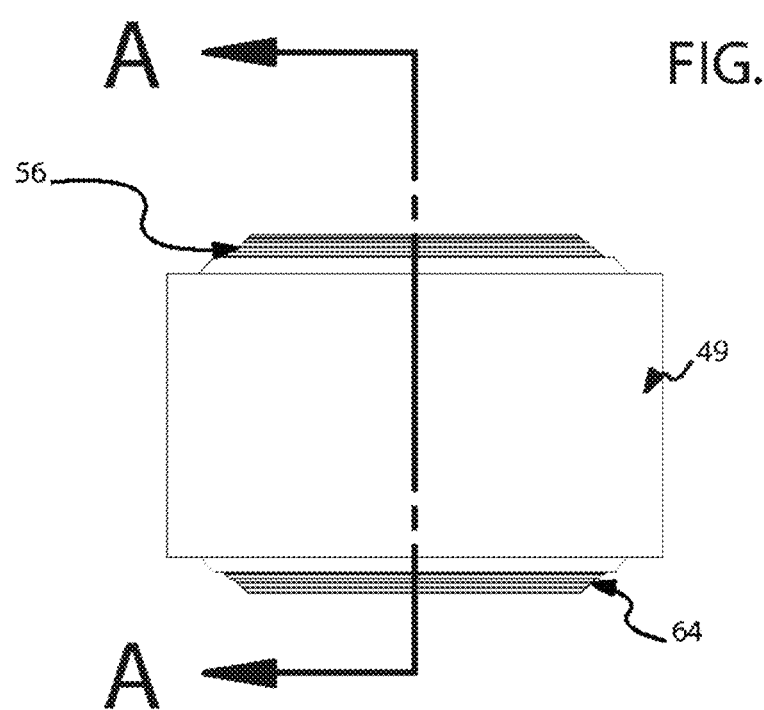
FIG. 9B is a side view of the flywheel housing with line A-A bisecting it.

FIG. 9A shows a side perspective view of this assembly of the flywheel 49 with interior magnets 54 shown embedded in the core of laminated iron 58. FIG. 9B shows a side view of flywheel assembly 49 having magnets 56 and 64 with bisecting line A-A shown extending there-through.

Figure 10A:
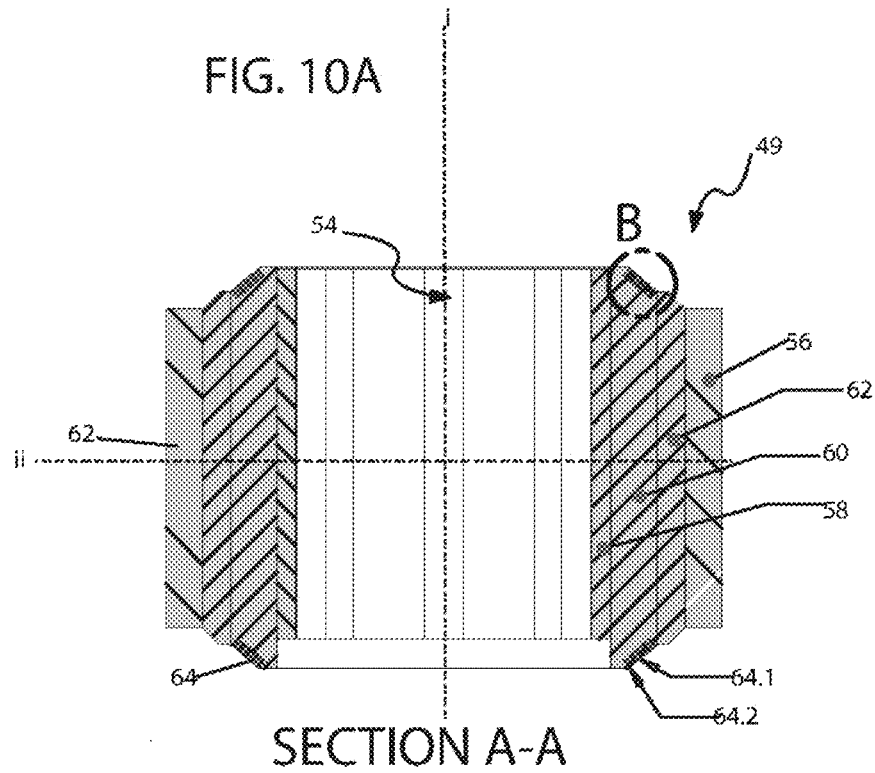
FIG. 10A is a side cross-sectional view of the flywheel inside of the housing taken along the line A-A of FIG. 10B.

FIG. 10A shows a side cross-sectional view of the flywheel assembly 49 taken along line A-A. This view shows the longitudinal axis which is also the axis of rotation i. This view shows the different sections including magnet 54 shown in an inner view, core 58 as well as the rim of steel 60 and the carbon fiber insert 62 disposed outside of the rim of steel. Magnets 56 and 64 extend circularly or annularly around the flywheel and are shown extending on a diagonal plane at approximately a 45 degree angle from the longitudinal extension of the core of laminate iron 58 and/or the carbon fiber insert 62. In this position, the field created by the high temperature superconducting (HTS) magnets 147 and 82 balances these magnets 56 and 64 in at least two dimensions. The first dimension is the axis of rotation i of the flywheel which runs parallel or substantially parallel to the longitudinal extension of the core as well as the carbon fiber insert 62. The second dimension ii is substantially perpendicular to this axis of rotation. Because the magnet is configured to support the flywheel in this dimension as well, this keeps the flywheel from moving laterally thereby preventing the offset of the axis of rotation of the flywheel.

Figure 10B:
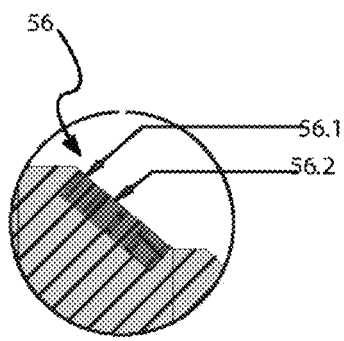
FIG. 10B is a side cross-sectional view of the section B taken from FIG. 12A.

These magnets 56 are shown in greater detail in FIG. 10B which shows detail B from FIG. 10A. In this view there are a plurality of magnets 56.1 and 56.2 separated by a non-magnetic section thereby creating a seat for the magnet. These magnets can be made from any suitable material but in this case are made from permanent magnets in a known manner. When the temperature within the housing, and particularly within the region of the flywheel drops to a sufficiently low temperature such as below 77 Kelvin, then these magnets become superconducting magnets which provides a sufficient field so that flywheel assembly 49 can rotate about an axis of rotation without contacting another object and while being supported by a field created by other magnets.

Figure 11A:
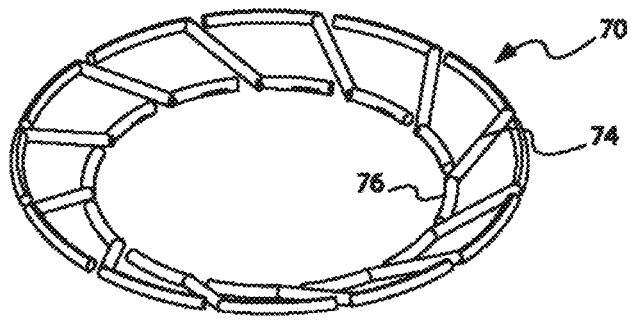
FIG. 11A is a view of the cooling or heat pipes taken from the housing.
Figure 11B:
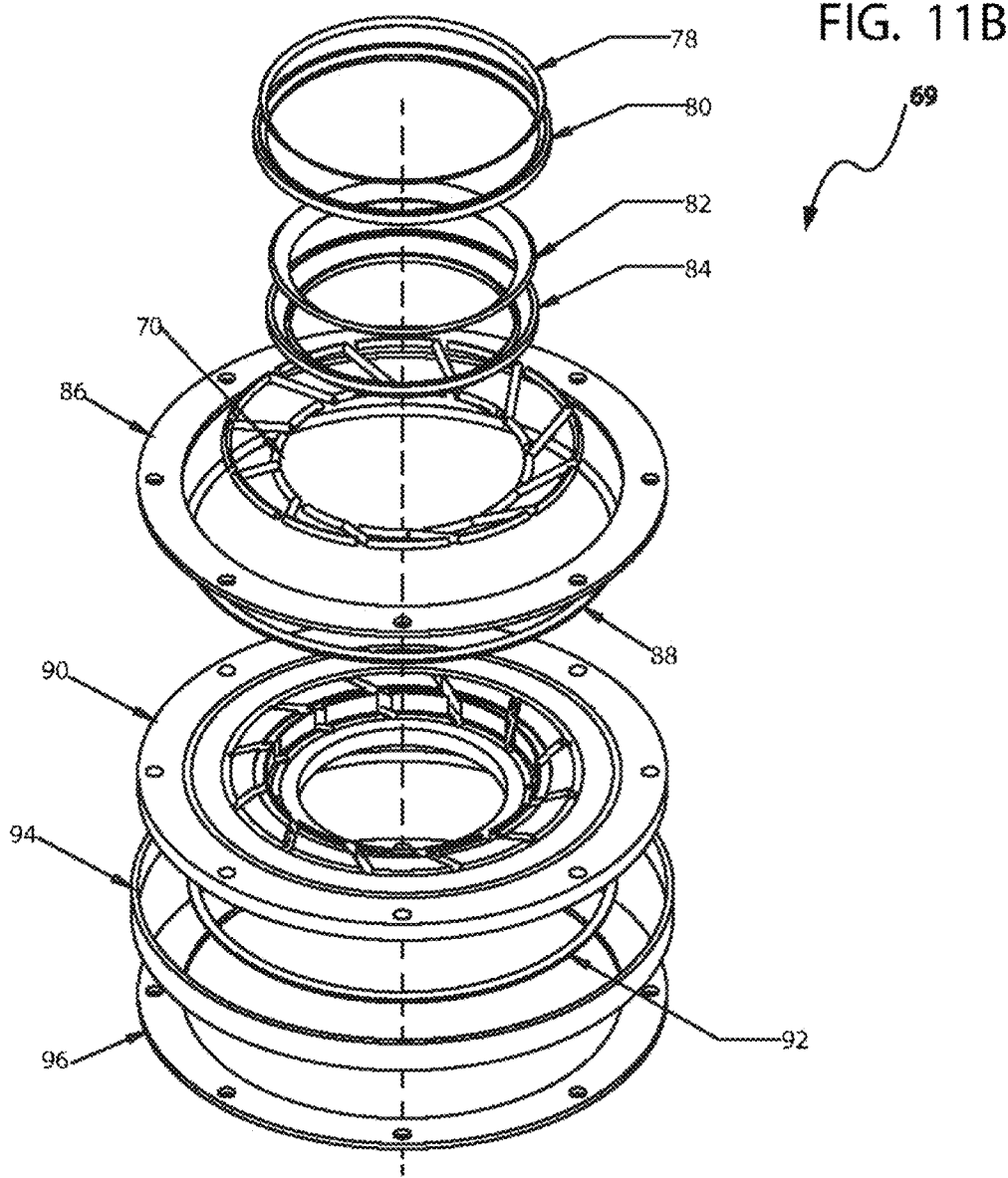
FIG. 11B is an exploded perspective view of the end section.

FIGS. 11A and 11B show the end portion of the housing opposite end portion 14. This end portion 69 includes heat pipes 70 which are substantially Z-shaped, and which extend in a first plane and a second plane based upon the orientation of this end portion 69 when it is mounted along a horizontal axis. Essentially, these heat pipes 70 extend along two different axes such that these axes are substantially transverse to each other. Each of these heat pipes 70 is a closed self-contained heat pipe with three sections a first section 72, a second section 74 extending substantially perpendicular to first section 72 and a third section 76.

This end portion 69 includes a pad or landing 78 fitted inside this end region. This pad or landing 78 is configured to receive bearings inside of this housing. In addition, there is a bearing landing 80 which is disposed in this end section as well which is positioned on the heat sink transfer 90 and which is configured to support pad 78. These components are shown as circular type components which are configured to form a circular style end piece or end portion 69. There is a ring magnet 82 which is formed as a ring having a substantially 45 degree angle formed as an annular conical ring. While the ring angle is stated as being substantially 45 degrees, any suitable angle off from an entirely vertical angle can be used.

For example, the angle can be approximately 40 degrees off from horizontal or approximately 50 degrees off from horizontal, or approximately 35 degrees off from horizontal or approximately 55 degrees off from horizontal or approximately 30 degrees off from horizontal or approximately 60 degrees off from horizontal or approximately 25 degrees off from horizontal or approximately 65 degrees off from horizontal or approximately 20 degree off from horizontal or approximately 70 degrees off from horizontal. In fact, the real feature of this system is that the angles of the magnets are such that they are offset from either a perfectly vertical or horizontal axis such that they provide both support against gravitational forces as well as support against axial forces acting on the flywheel when it is rotating about its axis. For example, when the flywheel is rotating in the housing, in at least one embodiment the flywheel is rotating about an axis of rotation which is substantially vertical. The angled positioning of these magnets provides for both vertical stabilization and levitation off of any adjacent surface along with horizontal stabilization from axial movement sideways causing the flywheel to rotate off of its axis of rotation. In this way, the angled position of these magnets 56, 64, 82, and 147 (See FIG. 17) positions the flywheel on a stabilized substantially frictionless media inside of the housing. The inside of this housing can be filled with any suitable media or gas such that it does not interfere with the rotation of the flywheel.

Magnet 82 rests on a block support 84. This block support 84 can be formed from any suitable material, and in this case, is formed from copper or steel such as stainless steel. Disposed adjacent to block support 84 are heat pipes 70 which as described in FIG. 11A are formed as closed Z-shaped individual heat pipes. These heat pipes are configured to draw heat away from the magnets such that the temperature adjacent to the magnets is at or below 77 degrees Kelvin.

An insulation plate support 86 is positioned adjacent to these heat pipes and can be made from any suitable insulation material such as a phenolic or other cryogenic insulating material. This insulation plate support 86 is configured to rest on heat sink transfer 90 which is configured to receive heat pipes 70. There is an O-ring compression seal 88 which is configured to sit on the heat sink transfer 90 adjacent to insulation plate support 86 (See FIG. 12B).

Heat sink transfer 90 is configured to transfer heat from an inside of the container to an outside region of the container. Heat sink transfer 90 can be made from any suitable material, but in this case is made from copper. An insulating compression O ring 92 is positioned adjacent to heat sink transfer 90 and is configured to support heat sink transfer 90 in cover 106. This compression O-ring is made from any suitable material and in this case can form a gasket made from any suitable sealing or insulating material such as rubber, or any suitable polymer or composite material. An insulating plate support 96 is configured to insulate a bottom end of heat sink transfer 90 from any heat gain. This insulating plate support can be made from any suitable material.

FIG. 12A shows a side view of this end portion 69 with section line A-A extending therethrough. FIG. 12B shows a side cross-sectional view of this end support wherein this side cross-sectional view shows the assembly of these components with heat sink transfer 90 being coupled to plates 86, 96 and ring 94. O-rings 88 and 92 are compression rings and are positioned adjacent to these plates. A bearing landing 80 is positioned or situated on heat sink transfer 90 with magnet 82 sitting on block support 84. Block support 84 sits on heat pipe section 76. FIG. 12C shows a top perspective view of this design as well.

Figure 13A:
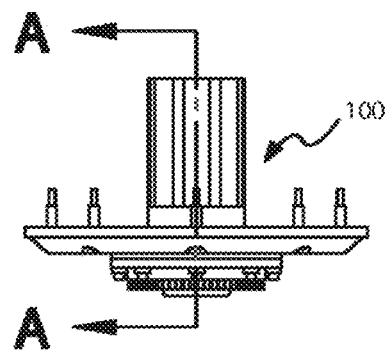
Figure 13B:
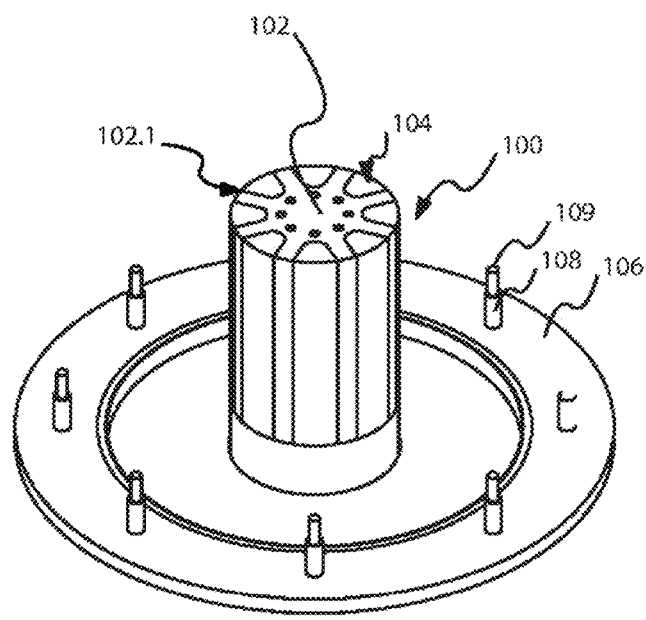
FIG. 13B is a perspective view of the stator.

FIG. 13A shows a side view of a stator assembly 100 with cross-section line A-A extending there through. FIG. 13B shows a top perspective view of this stator assembly 100 which includes a stator core 102, as well as a plurality of magnets 104 positioned within this stator. This stator core can be made of any suitable material but in this design comprises steel. Magnets 104 can be made from any suitable material, and in this case can be made from either a ferromagnetic material or rare earth elements. There is a cover 106 which forms an end cover for the device and which has a plurality of screws 109 situated in screw sleeves 108. Core 102 is shaped in a substantially star shaped pattern with fingers 102.1 extending out from a central region.

Figure 13C:
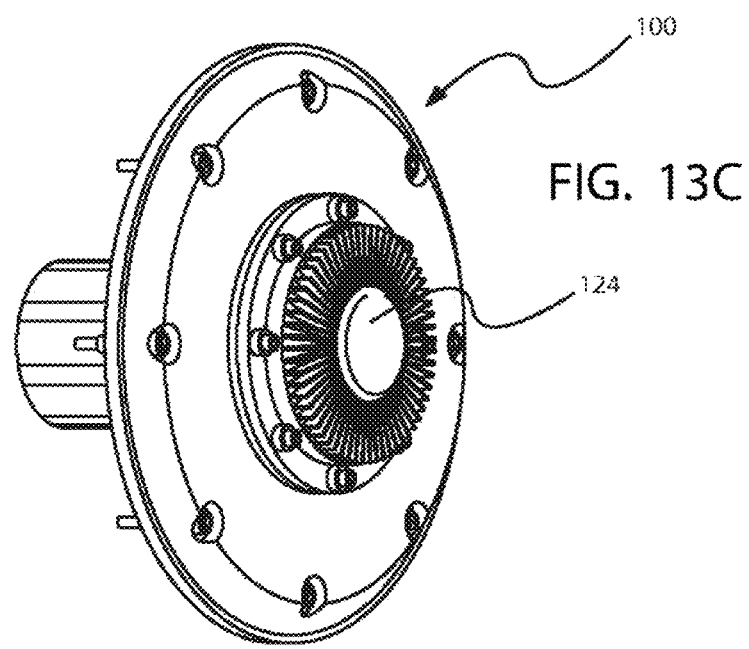
FIG. 13C is a side perspective view of the stator.

FIG. 13C shows a side or end view of this stator assembly 100 which shows synjet 124 which is coupled to this end.

Figure 14:
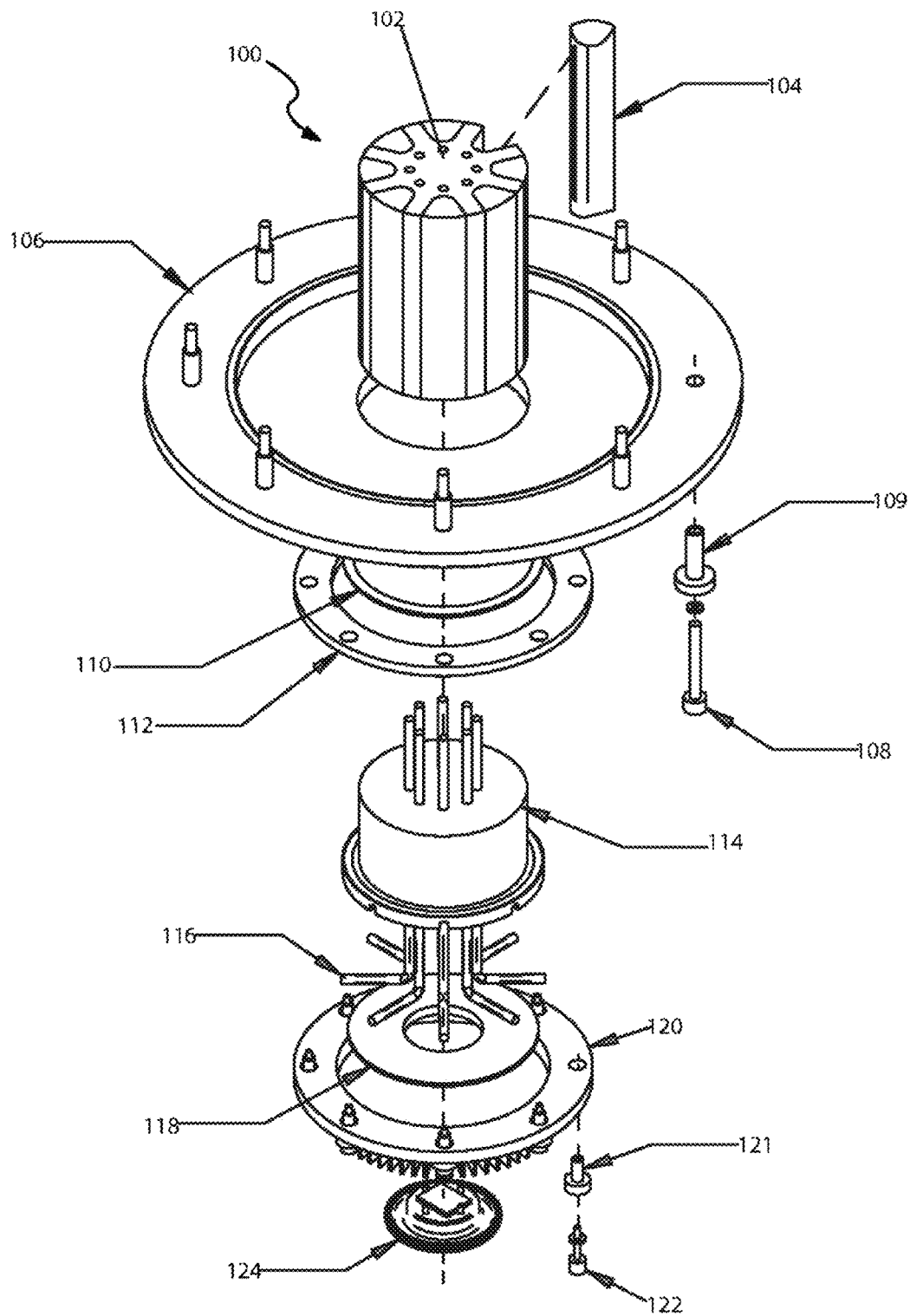
FIG. 14 is an exploded perspective view of the device.

FIG. 14 shows an exploded view of this stator assembly 100 which shows magnet 104 removed from the stator core 102. Thus, as shown there are a plurality of magnet sections 104 positioned radially around stator core 102 which are configured to provide a plurality of different magnets at different radial regions around the stator. Cover 106 is shown positioned adjacent to O ring 110. An insulation plate support 112 is coupled to this cover 106 A heat sink transfer base 114 for heat pipes 116 is configured to support these heat pipes 116 therein. This heat sink transfer base 114 can be made from any suitable heat material and in this embodiment, is made from copper windings. Heat pipes 116 extend in a substantially L-shaped manner extending in a first axial direction and then in a second axial direction substantially transverse to the first axial direction. A plurality of these heat pipes are dispersed radially around this base 114. A thermo electric cooler 118 is configured as a ring shaped cooler positioned within heat sink cooler 120. The thermo electric cooler cools the heat sink cooler 120. The thermo electric cooler 118 draws the heat from the heat pipes in the stator to draw heat from the stator. A plurality of screws 122 are positioned within sleeves 121 which secure this heat sink transfer within the housing. A synjet 124 is coupled to this heat sink cooler 120 as well. This synjet draws air into the cooler 120 to draw heat away from cooler 120. The cooling system for the stator which includes heat pipes, as well as the heat pipes cool the system to 248K which is higher than the 77K for the HTS magnets inside the housing. These HTS magnets can be made from Yttrium Barium Copper Oxide. (YBCO).

Figure 15A:
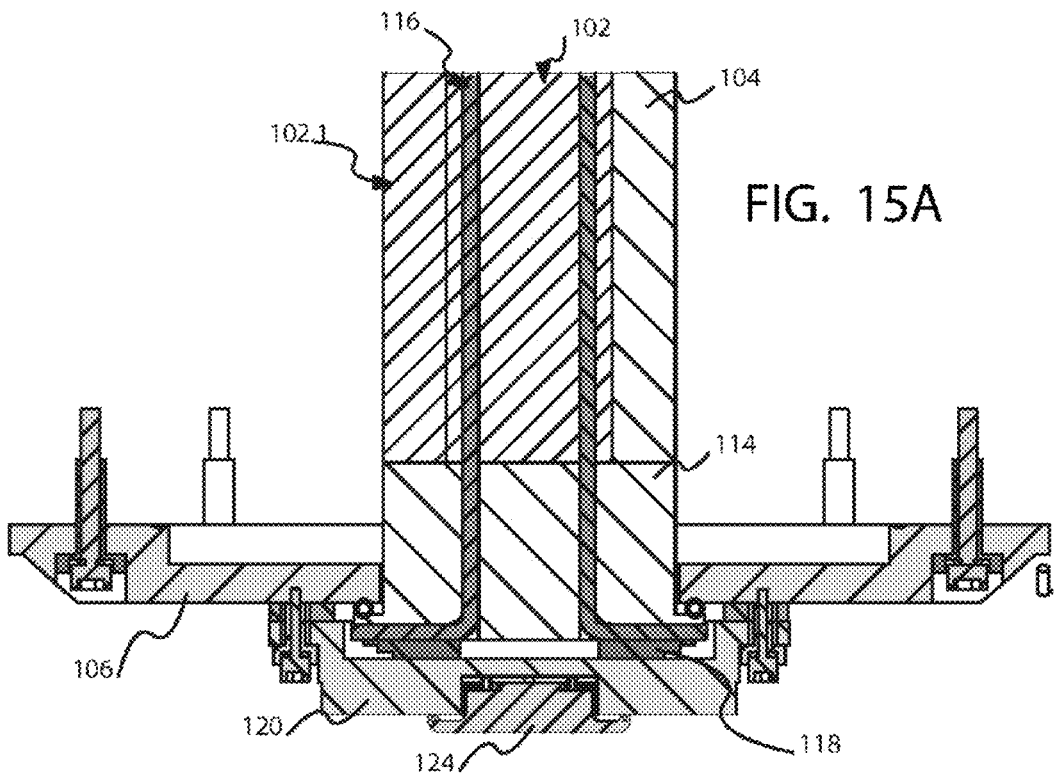
FIG. 15A is a side cross-sectional view of the stator.

FIG. 15A is a side cross-sectional view of the stator assembly shown in FIG. 14. This stator assembly includes a plurality of heat pipes 116 extending radially around a core 102. Core 102 can be made from any suitable material but in this case is made from steel. Disposed adjacent to core 102 are magnets 104 have a permanent magnet core with coils such as copper windings disposed or wrapped around these magnets. When these coils are charged with electrical energy, particularly AC energy these coils form a push-pull form of electrical generation as the electrical energy alternates thereby causing the drive of the flywheel around the stator. Heat pipe 116, which can be made from any suitable material, but in this case is made from copper extends along the longitudinal i and latitudinal axes ii. Disposed adjacent to cover 106 is heat sink cooler 120. Cooler 120 is disposed adjacent to thermo electric cooler solid state component 118 which is positioned adjacent to heat pipe 116. Heat sink cooler 120 is made from any suitable material such as aluminum and this cooler is positioned adjacent to synjet 124.

Cover 106 is shown adjacent to heat sink transfer base 114 which is positioned adjacent to core 102. Heat sink cooler 120 is coupled to cover 106 with heat sinks 116 and thermo electric cooler 118 positioned in between. Compression O ring 110 is positioned between heat sink transfer base 114 and cover 106 as well forming a sealed connection.

Figure 15B:
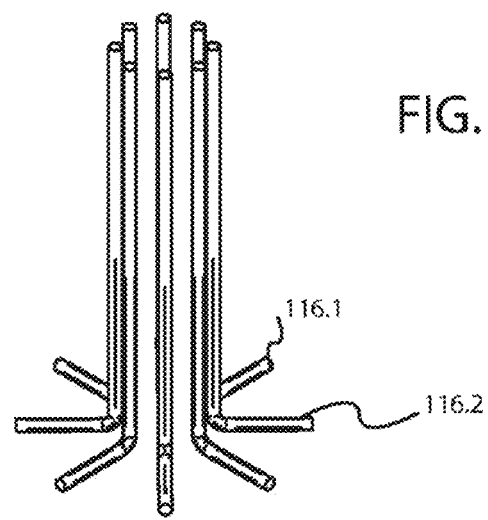
FIG. 15B is a perspective view of the heat pipes.

FIG. 15B shows the heat pipes 116.1 and 116.2 which are disposed radially around the heat sink as well. This view shows heat pipes 116.1 and 116.2 which are substantially L-shaped and which can be made from any suitable material such as copper.

Figure 16:
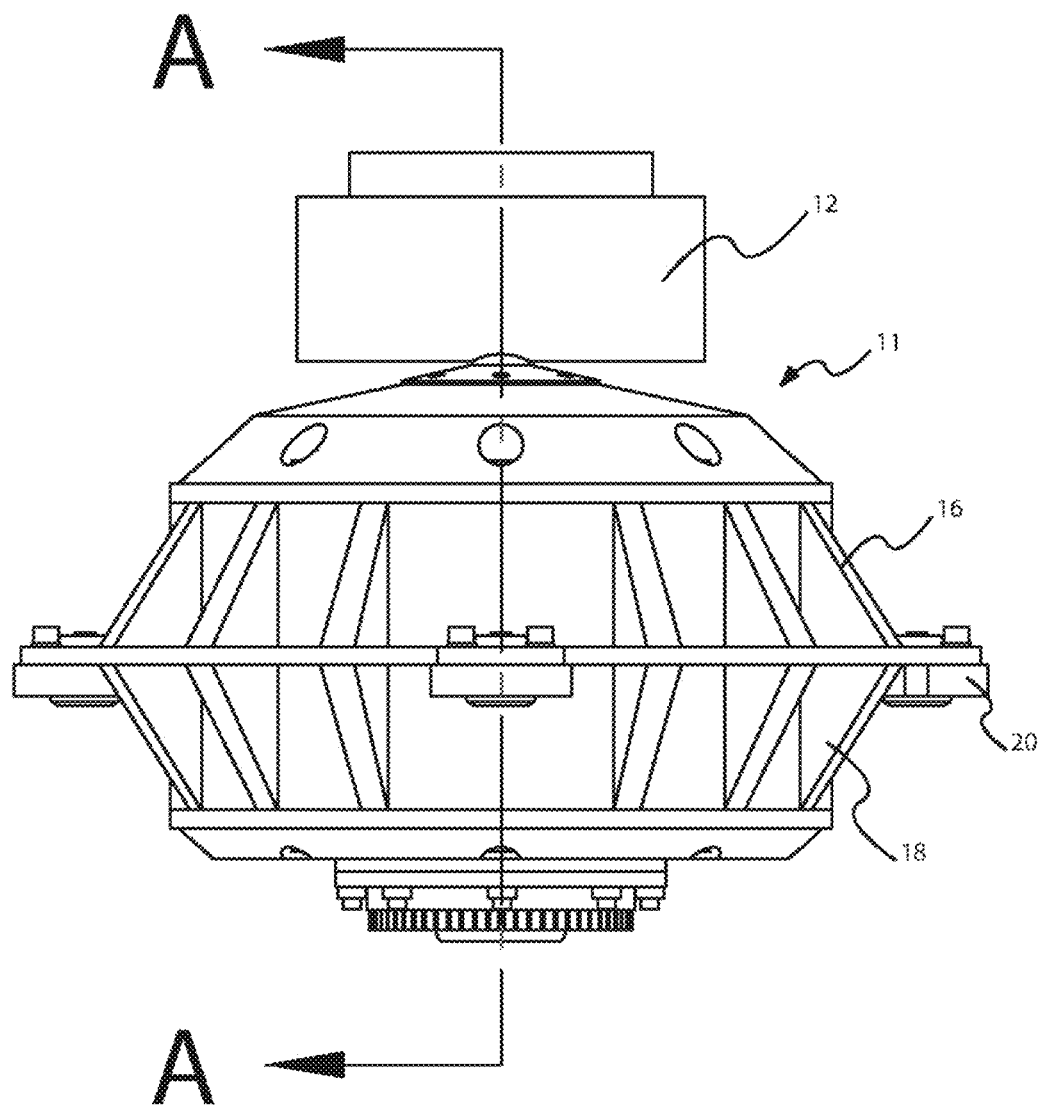
FIG. 16 is a side view of the device taken along the line A-A.

FIG. 16 is a side view of the device 10 which includes line A-A extending there-through. This view shows housing 11 which includes a first half 16 and second half 18 as well as boots or dampers 20. The device can be secured to an adjacent device or support via boots or dampers 20.

Figure 17:
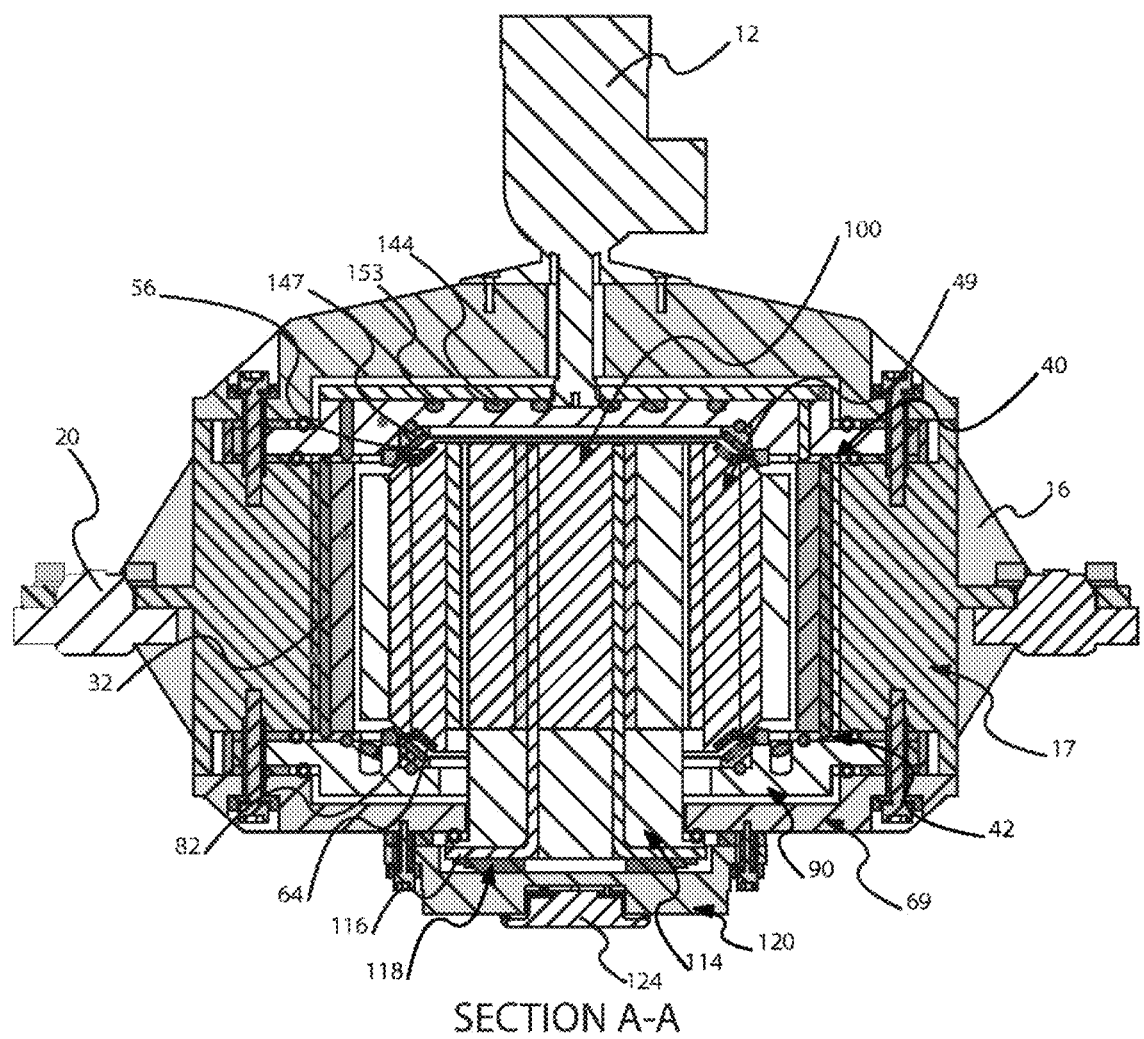
FIG. 17 is a side cross-sectional view of the device taken along the line A-A shown in FIG. 16.

FIG. 17 shows a side view of the assembled device. This assembled device shows cryocooler 12 positioned coupled to cover 14. Cover 14 is coupled to main housing body 17 which has first half support 16 and second half support 18. A plurality of inner heat pipes 144 and outer heat pipes 153 are positioned around heat sink transfer top or block 145. These heat pipes extend down to heat sink transfer plate 40. Heat sink transfer plate 40 transfers the cooling or heat from heat pipe 144 and 153 to heat pipes 30. The second section 32 of heat pipe 30 extends down to heat sink transfer plate 42 at the opposite end. Plate 42 is in contact with heat pipes 70. Heat pipes 70 are in contact with heat sink transfer 90. Heat sink transfer 90 is in contact with heat sink transfer base 114 and is covered by cover 106. Heat sink transfer base 114 has heat pipes 116 disposed therein which extend on one end from the opposite end of stator 102 down to thermo electric cooler 118. Coupled to thermo electric cooler 118 is a heat sink cooler 120. A thermoelectric cooler or thermoelectric heat pump is a solid-state active heat pump which transfers heat from one side of the device to the other, with consumption of electrical energy, depending on the direction of the current. The device is a solid state refrigerator, or thermoelectric cooler (TEC). They can be used either for heating or for cooling (refrigeration), although in practice the main application is cooling. It can also be used as a temperature controller that either heats or cools.

Coupled to heat sink cooler 120 is synjet 124. Thus, as shown, this device has at least two different cooling systems extending from a first end to a second end. The first cooling system driven by the cryocooler is configured to drop the temperature to 77 degrees Kelvin for the high temperature superconducting (HTS) magnets 147 and 82. These HTS magnets trap the magnetic field lines caused by permanent magnets and do not allow the magnetic field to move.

The second cooling system is configured to drop the temperature to 248K for the core stator section wherein this cooling is performed by the heat pipes 116 down to the solid state thermo electric cooler 118 which dispels heat from the cooler 120 and the synjet 124. These cooling systems are powered by outside power sources. In addition, the stator which powers windings on magnets is coupled to an outside power source as well such that the electrical energy from the stator transfers into magnetic energy to the magnetic elements or magnets 104 thereby creating a magnetic field acting on magnets 54 to drive the flywheel into rotation. The greater the energy transferred to stator 100, the greater the creation of the magnetic field which then translates into kinetic energy of a spinning flywheel 49. The flywheel spinning at a high rate such as 100,000 rpms stores this kinetic energy so that when electrical energy is needed, it can be drawn out from the kinetic energy of the flywheel in a known manner reverse to that described above.

In addition, the closed end structure of these heat pipes and the closed end structure of the cryogenic cooler as well as the Thermo electric cooler 118 on the heat pipes creates a closed circulating cooling system which has no or substantially no loss to any cooling materials thereby creating a substantially efficient cooling design. Furthermore, the angle of position of these magnets such as magnets 56, 64, 82, and 147 creates an automatically stabilized in at least two axial directions.

Figure 18A:
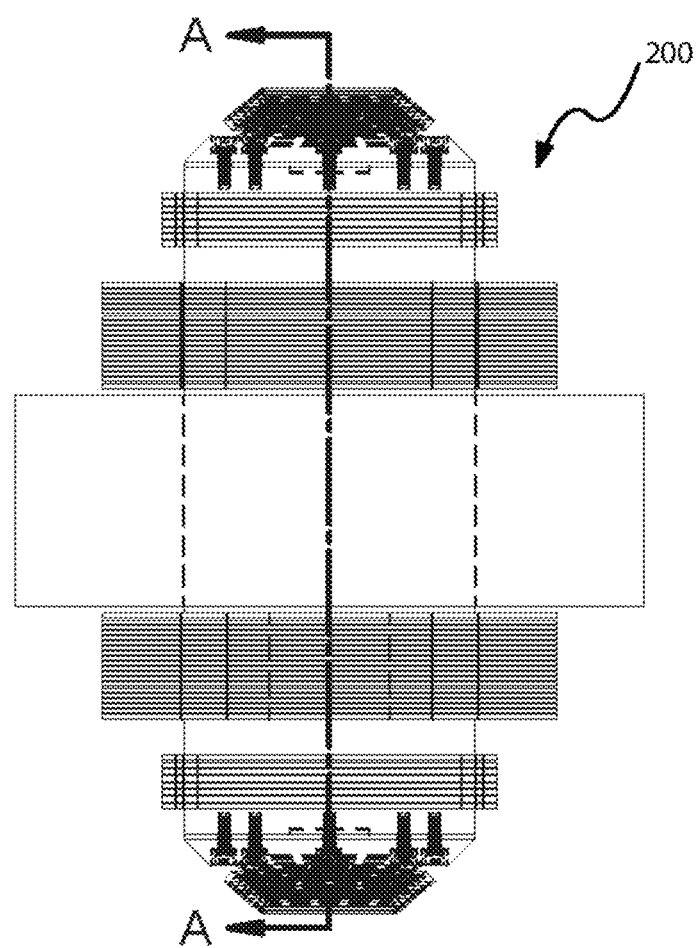
FIG. 18A is a side view of another embodiment.
Figure 18B:
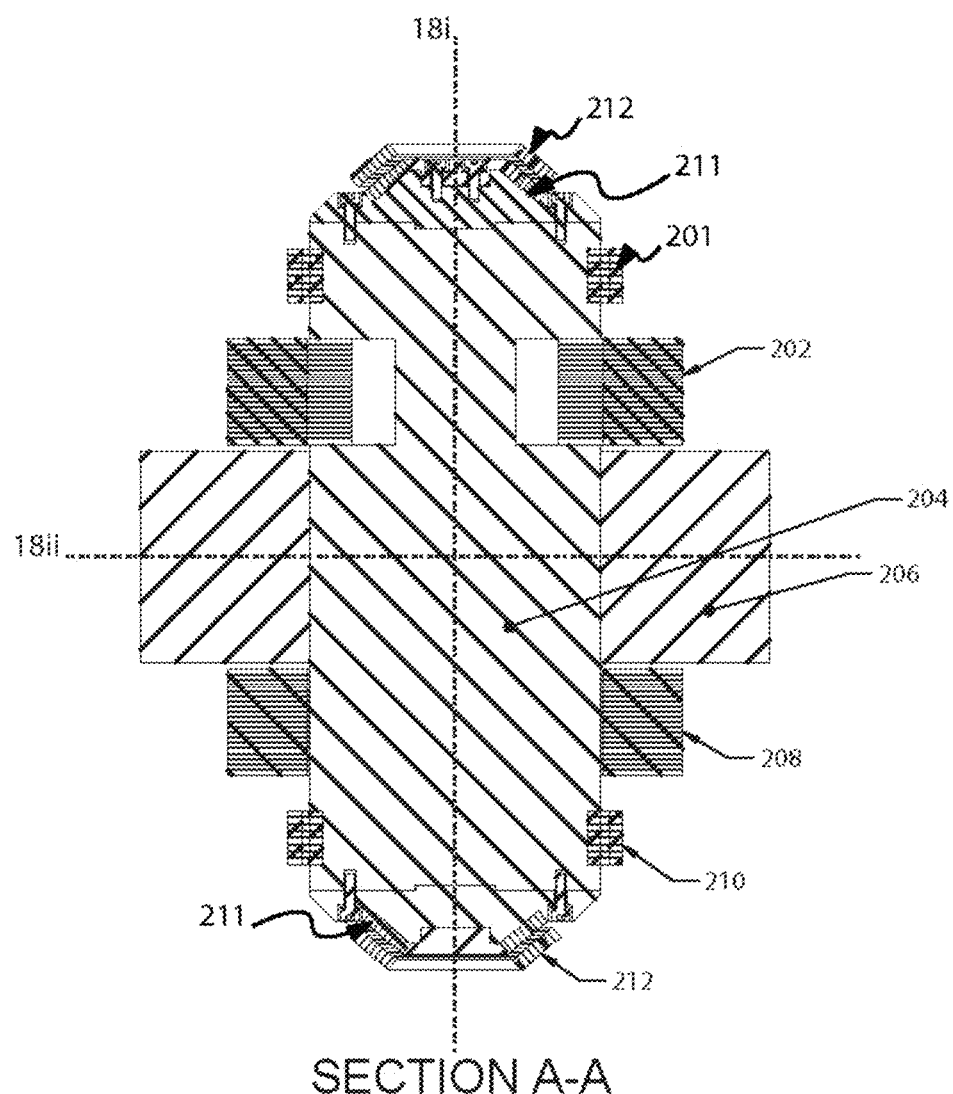
FIG. 18B is a side cross-sectional view of the embodiment of FIG. 18A taken along line A-A.
Figure 18C:
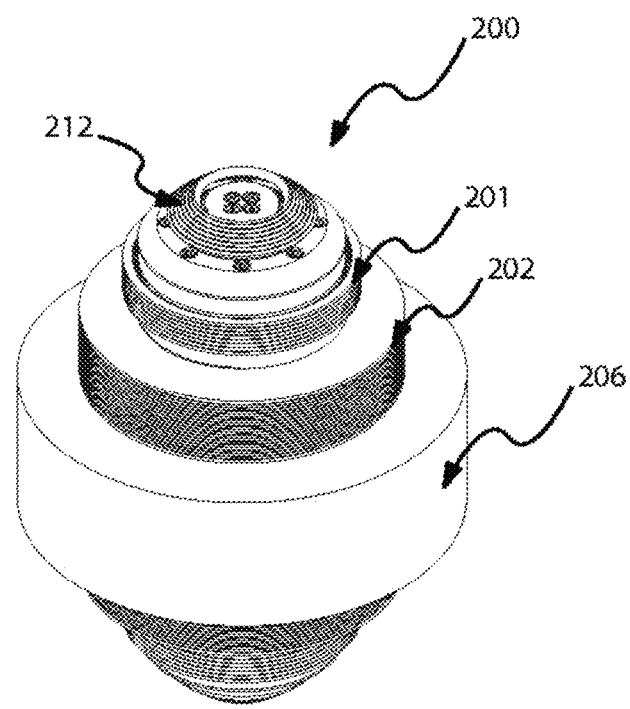
FIG. 18C is a perspective view of the embodiment of FIG. 18A and FIG. 18B

FIGS. 18a, 18B and 18C show an alternate design. As an alternate design, the flywheel 200 can be built with a homopolar motor with an internal rotor 204, and with two body rotor disposed inside of an external stator 202.

The internal rotor 204 as such is stabilized by two sets of High Temperature Superconductive conical (HTS) bearings 211 and two sets of HTS radial bearings 201. The radial bearing 201 eliminates perpendicular instability, while the conical bearings 211 eliminate both horizontal and perpendicular stability at the end of the rotor shaft. Bearings 201 are acted upon stator magnet 202 which is an electromagnet, while bearing magnet 211 are acted upon by magnets 212 positioned in the end cap 214.

The bearings 202 and 211 maintain the internal rotor in the center of the stators and due to the inherent characteristics of the HTS material that trap the magnetic fields without the use of electronic control.

The shaft 204 rotates along longitudinal axis 18i, has a carbon fiber ring 206, that allows for additional mass, and maintains the steel rotor shaft 204 from coming apart such as along latitudinal axis 18ii during high speed operation.

Below is a parts list with an example of a material that can be used for each part. For each part, any suitable alternative materials can be used instead, so therefore, the materials disclosed are only meant as an example, and are not intended to limit the application:

10 Device Thermoelectric cooler
11 Housing Housing for the, Thermoelectric Cooler
12 cryogenic cooler cools to 77 degrees K. Motor/compressor, etc closed system
14 cover, (Cryocooler) Stainless Steel
15.1 screw Stainless Steel
15.2 screw cover Phenolic or any other cryogenic insulating material
16 First half of housing Stainless Steel
16.1 Surface Stainless Steel
16.2 Drill holes
16.3 Rim
17 body section of housing (Mount Lip) Stainless Steel
17.1 opening Stainless Steel
17.2 gap or opening (Cryocooler Cover Counter bore)
17.3 second gap or opening (Thermoelectric cooler counter bore
18 Second half of housing Stainless Steel
19 opposite or second cover Stainless Steel
20 Shock absorber or Boot or Damper Rubber and stainless
21 screw Stainless Steel
22 washer Stainless Steel
30 Heat Pipe Stainless Steel walls, porous metal wick with liquid nitrogen interior. Wall can be made of copper as well.
31 first section of heat pipe, (Shield Heatpipes) Wall-Stainless Steel, Wick is porous metal, Fluid is Liquid Nitrogen
32 second section of heat pipe Wall-Stainless Steel, Wick is porous metal, Fluid is Liquid Nitrogen
33 third section of heat pipe Wall-Stainless Steel, Wick is porous metal, Fluid is Liquid Nitrogen
39 Outer casing, (Protective Shield/Heat Transfer Safety Rim)
40 Transfer plate copper 42 transfer plate Copper
44 Ring safety fiber Carbon Fiber
46 Recess in ring safety fiber Carbon Fiber
48 insulation sleeve Phenolic or any other cryogenic insulating material
49 Flywheel assembly
50 Ring separation pole
52 magnet Magnetic material
56 remaining magnets Magnetic material
58 core/laminated iron Motor lamination material
60 Rim Steel Stainless Steel
62 Insert flywheel Carbon Fiber
64 Magnet HTSC YBCO-Yttrium barium copper oxide
70 heat pipe Wall-Stainless Steel, Wick is porous metal, Fluid is Liquid Nitrogen
72 first section of heat pipe Wall-Stainless Steel, Wick is porous metal, Fluid is Liquid Nitrogen
74 second section of heat pipe Wall-Stainless Steel, Wick is porous metal, Fluid is Liquid Nitrogen
76 third section of heat pipe Wall-Stainless Steel, Wick is porous metal, Fluid is Liquid Nitrogen
78 pad, landing Cryo-teflon
80 bearing landing Stainless Steel
82 ring magnet/puck Stainless Steel
84 block support for magnet copper
86 Insulation plate support Phenolic or any other cryogenic insulating material
88 O ring compression Cryo Rubber/Stainless internal structure
90 Heat sink transfer Phenolic or any other cryogenic insulating material
92 O ring compression Cryo Rubber/Stainless internal structure
96 Plate support for insulation Phenolic or any other cryogenic insulating material
100 Stator Assembly
102 core, stator Steel
104 magnet/stator Copper Winding
106 cover/housing Stainless Steel
108 sleeve Phenolic or any other cryogenic insulating material
109 screw Stainless Steel
110 O-ring compression Cryo Plastic/Stainless internal structure
112 insulation plate support Phenolic or any other cryogenic insulating material
114 Heat sink transfer base for heat pipe Copper Winding
116 heat pipe Copper only cools to 248 k
118 thermo electric cooler solid state component
120 Heat sink Cooler Aluminum
121 Screw Sleeve Insulation Phenolic or any other cryogenic insulating material
122 screw Stainless Steel
124 Synjet
141 insulation plate Phenolic or any other cryogenic insulating material
142 insulation plate body Phenolic or any other cryogenic insulating material
143 compression o ring Cryo Rubber/Stainless internal structure
144.1 inner heat pipeWall-Stainless Steel, Wick is porous metal, Fluid is Liquid Nitrogen
144.2 outer heat pipeWall-Stainless Steel, Wick is porous metal, Fluid is Liquid Nitrogen
145 heat sink transfer top Stainless Steel
146 Block support for magnet Copper
147 Magnet Magnetic material
148 bearing landing Stainless Steel
149 Pad Landing Cryo-teflon Glass impregnated
150 Compression O Ring Cryo Rubber/Stainless internal structure
151 Plate Support for Insulation Phenolic or any other cryogenic insulating material
152 Ring Sleeve insulation Phenolic or any other cryogenic insulating material
153.1 first curved section Wall-Stainless Steel, Wick is porous metal, Fluid is Liquid Nitrogen
153.2 second section transverse to first curved section Wall-Stainless Steel, Wick is porous metal, Fluid is Liquid Nitrogen
153.3 Curved section Wall-Stainless Steel, Wick is porous metal, Fluid is Liquid Nitrogen
156 Inner Region of Housing
157 First radially outer region
158 Second radially outer region which is outside the first radially outer region
200 Another embodiment
202 Stator electromagnet
201 Radial Bearing High Temperature Superconducting (HTS) magnet
204 Rotor core
206 Carbon Fiber
208 Oppositely spaced stator electromagnet
210 radial bearing of HTS magnet
211 Conical HTS magnets
212 Stator Magnets stabilizing magnets 211
214 End cap Accordingly, while at least one embodiment of the present invention have been shown and described, it is to be understood that many changes and modifications may be made thereunto without departing from the spirit and scope of the invention as defined in the appended claims.

What is claimed is:

1. An energy storage device comprising;
a) a housing;
b) at least one flywheel disposed in said housing;
c) at least one stabilizing element disposed in said housing configured to stabilize said flywheel; and
d) at least one cooling element for cooling a region interior of said housing to a preset temperature;
wherein said at least one cooling element comprises a plurality of heat pipes formed in a spiral pattern; and
wherein said plurality of heat pipes in said spiral pattern comprise a first section that is formed curved and radiates out from a central region, and a second section which is coupled to said first section and which extends substantially perpendicular to said first section.

2. The energy storage device as in claim 1, wherein said at least one stabilizing element comprises a magnet.

3. The energy storage device as in claim 1, wherein said at least one stabilizing element is orientated at a position offset from a horizontal extension.

4. The energy storage device as in claim 1, wherein said at least one stabilizing element is orientated at a position offset from a vertical position.

5. The energy storage device as in claim 1, wherein said at least one stabilizing element is orientated at a position between a horizontal position and a vertical position.

6. The energy storage device as in claim 1, wherein said at least one stabilizing element comprises at least one magnet coupled to said flywheel orientated at a first angle and at least one magnet coupled to said housing orientated at an angle substantially parallel to said first angle of orientation of said magnet coupled to said flywheel.

7. The energy storage device as in claim 1, wherein said at least one cooling element comprises a cryogenic cooling system coupled to said housing, wherein said cryogenic cooling system further comprises heat pipes coupled to said cryogenic cooling system for removing heat from the housing.

8. The energy storage device as in claim 7, wherein said cryogenic cooling system is a self-contained sealed system.

9. The energy storage device as in claim 1, further comprising a motor disposed inside of said housing.

10. The energy storage device as in claim 1, wherein said plurality of heat pipes comprises a plurality of heat pipes having a first end positioned adjacent to a center region of the housing of the energy storage device and which radiate out towards an outer region of said housing of the energy storage device.

11. The energy storage device as in claim 10, wherein said plurality of heat pipes further comprises at least one additional curved section which extends back in a direction substantially opposite said first curved section.

12. The energy storage device as in claim 11, wherein said plurality of heat pipes comprise a first set of heat pipes comprising an inner set of heat pipes and a second set of heat pipes comprising an outer set of heat pipes extending or radiating to a region outside of said first set of heat pipes in relation to a center region of the housing.

\* \* \* \* \*